Feb. 2, 1926.
C. ANDERSON
BRAKE LINING
Filed Dec. 12, 1924
1,571,443
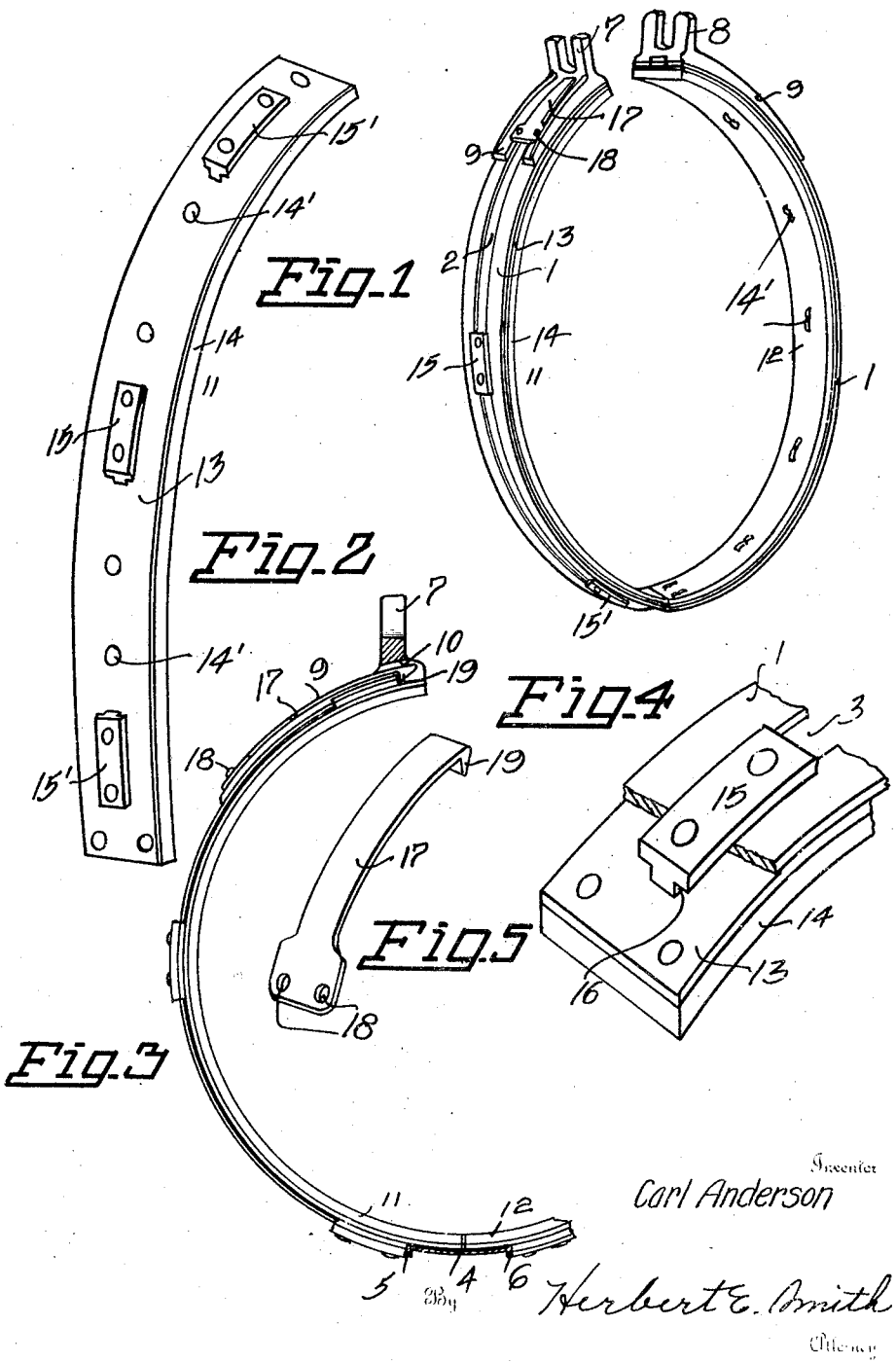

Patented Feb. 2, 1926.

1,571,443

UNITED STATES PATENT OFFICE.

CARL ANDERSON, OF ROZA, WASHINGTON, ASSIGNOR OF ONE-HALF TO THOMAS C. DOOLITTLE, OF ROZA, WASHINGTON.

BRAKE LINING.

Application filed December 12, 1924. Serial No. 755,438.

*To all whom it may concern:*

Be it known that I, CARL ANDERSON, a citizen of the United States, residing at Roza, in Kittitas County and State of Washington, have invented certain new and useful Improvements in Brake Linings, of which the following is a specification.

My present invention relates to an improved brake lining of the flexible type and designed for use in connection with split, resilient brake bands which are adapted to be clamped about the exterior periphery of clutch, brake, or transmission drums or disks. In the Ford type of automobiles where the transmission or brake bands operate over a drum or disk and lugs and brake rods are utilized to draw the ends of the band together to reduce the diameter of the band, because of the construction of the transmission housing and of the arrangement of the transmission mechanism within the housing, great difficulty is experienced in assembling or withdrawing the split bands and their linings or rubbing surfaces. Because of this difficulty, while the cost of the linings is low, on the other hand the expense due to time and labor expended in assembling, withdrawing, and replacing the bands or linings is comparatively excessive. To reduce the required expenditure of time and labor my invention contemplates the utilization of a split circular band and lining which permit the assembling, replacing or repairing of these parts with facility and convenience after the cover plate has been removed from the housing and the operative connections have been disconnected from the bands.

These purposes are accomplished by the utilization of certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a perspective view of a brake band embodying my invention.

Figure 2 is an enlarged perspective view, detached, of one of the linings or strips.

Figure 3 is a view showing a portion of the brake band in section with one of the liner strips and a retaining latch in operative position.

Figure 4 is an enlarged, detail, fragmentary view in perspective showing the relative arrangement of a liner strip with the slotted brake band.

Figure 5 is a perspective view of one of a pair of retaining latches used with the removable liner strips.

The band 1 is fashioned in the form of a split ring from flexible and resilient metal and provided with a pair of circumferentially extending, arcuate slots 2 and 3, which slots are open at the adjoining ends of the split band and extend therefrom toward the center of the band where they terminate in a solid portion 4 or plate the full width of the band. At the adjoining terminals of these slots outwardly and radially projecting lugs or spurs 5 and 6 are struck from the metal of the band during the process of manufacture of the bands, to form abutments.

The adjoining ends of the brake band are provided with the usual notched lugs 7 and 8 for the reception of the brake rod and connections, not shown, and these lugs are fashioned with bifurcated base flanges 9 that are riveted to the brake band. Each notched lug is provided with an under groove 10, extending transversely of the lug, and as seen in Figure 3, this groove is alined with the complementary slot and bifurcated base flange of the brake band.

The rubbing surfaces for the drum or disk are provided by the utilization of two lining sections 11 and 12 which are readily detachable from the band, and which may with equal facility be applied thereto.

As best seen in Figure 2 each liner section comprises a back plate 13 of resilient and flexible metal and a friction strip 14 secured thereto as by rivets 14'. The liner sections are adapted to be slid into or out of operative position with relation to the brake band and when properly positioned therein these sections form a complete annular friction member for frictionally engaging the disk or drum.

On the exterior face of the back plate of each lining section is arranged a series of spaced slide tongues 15, the two end tongues 15' being spaced equidistant from the respective ends of the section in order that either end of the section may be advanced toward the central portion 4 of the band, and either of the two tongues 15' may encounter and rest against a lug as 5 or 6.

Each of the slide tongues has a pair of lateral grooves 16 cut under the tongue for guiding the sections as they are slid along the band by co-action with the side walls of the slots of the band, and the tongues are fastened to the back plates by rivets or in other suitable manner to form rigid guiding and retaining members for the lining sections.

As will readily be apparent from an inspection of the drawings, the two lining sections are inserted in place by sliding them in opposite directions from the split ends of the band, with the foremost tongue passing through the under groove of a notch, and the succeeding tongues following in line as the section is passed around the band toward its central portion 4. The spaced end lugs 15' encounter one of the abutments as 5 or 6, and the ends of the sections pass these abutments and contact together as indicated in Figure 3, thus forming a continuous rubbing surface for the brake band for frictional engagement with the disk or drum.

For locking these removable sections in position I utilize a spring latch 17 at each end of the split band. The latches are attached to the bifurcated base flanges by rivets 18, and the free end of each latch is fashioned with an end hook 19. The latches are of resilient metal to permit passage of the tongues of the sections, and after the passage of the last tongue the hooks spring over the adjoining ends of the tongues, to retain the sections in proper position. For removing the lining sections it will readily be apparent that by springing the hooks from the tongues and grasping the free ends of the linings, singly, the lining sections may be pulled or slid along the brake band and withdrawn therefrom. New lining sections may be substituted by bending or flexing the latches for passage of the lining sections.

Having thus fully described my invention, what I claim as new and desire to secure by Letters Patent is—

1. The combination with a slotted brake band having an undergrooved lug and a bifurcated base flange on said lug, of a lining section having grooved tongues for co-action with said band and a spring latch on said base flange having a retaining hook to engage one of said tongues.

2. The combination with a slotted brake band having an integral abutment, an undergrooved lug and a bifurcated base flange on said lug, of a lining section having a grooved tongue adapted to engage said abutment and slidable in the slotted brake band, a second grooved tongue on said section, a spring latch on said base flange and a retaining hook on said latch adapted to engage the second tongue.

3. The combination with a brake band having a pair of circumferentially arranged arcuate slots and an integral abutment at the adjoining ends of said slots, a pair of undergrooved lugs and a bifurcated base flange for each of said lugs, of a pair of lining sections, each of said sections having a pair of grooved tongues spaced equidistant from its ends and one tongue of each section adapted to engage one of said abutments, a spring latch on each base flange, and a retaining hook on each latch adapted to engage the remaining tongue on said sections.

In testimony whereof I affix my signature.

CARL ANDERSON.